United States Patent
Langenfeld et al.

(10) Patent No.: US 8,464,610 B1
(45) Date of Patent: Jun. 18, 2013

(54) DRIVE DEVICE

(75) Inventors: Thomas J. Langenfeld, Sullivan, IL (US); Michael L. Bennett, Sullivan, IL (US); Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 717 days.

(21) Appl. No.: 12/533,871

(22) Filed: Jul. 31, 2009

Related U.S. Application Data

(60) Provisional application No. 61/085,612, filed on Aug. 1, 2008.

(51) Int. Cl.
F16H 57/02 (2006.01)
F16H 57/04 (2010.01)
F16H 61/00 (2006.01)

(52) U.S. Cl.
USPC ........................................... 74/606 R

(58) Field of Classification Search
USPC ............... 74/606 R, 607, 720, 730.1, 731.1
See application file for complete search history.

(56) References Cited

U.S. PATENT DOCUMENTS

| | | | |
|---|---|---|---|
| 3,360,933 A * | 1/1968 | Swanson et al. | 60/464 |
| 3,486,335 A * | 12/1969 | Sweigert et al. | 60/488 |
| 5,314,387 A | 5/1994 | Hauser | |
| 5,392,670 A | 2/1995 | Hauser | |
| 5,544,547 A * | 8/1996 | Ishimaru | 74/730.1 |
| 6,651,529 B1 | 11/2003 | Poplawsli et al. | |
| 6,986,406 B1 * | 1/2006 | Hauser et al. | 184/6.28 |
| 7,073,330 B1 | 7/2006 | Hauser | |
| 7,089,824 B2 * | 8/2006 | Nakatani et al. | 74/730.1 |
| 7,225,704 B2 * | 6/2007 | Ishii et al. | 74/606 R |
| 7,367,353 B1 | 5/2008 | Langenfeld et al. | |
| 7,503,172 B2 * | 3/2009 | Sakakura et al. | 60/427 |
| 7,788,919 B2 * | 9/2010 | Ohashi et al. | 60/484 |
| 2008/0018267 A1 | 1/2008 | Arakawa et al. | |
| 2008/0018269 A1 | 1/2008 | Wyatt et al. | |
| 2008/0041048 A1 * | 2/2008 | Kanenobu et al. | 60/484 |
| 2012/0297757 A1 * | 11/2012 | Kamikawa | 60/325 |

OTHER PUBLICATIONS

Unpublished U.S. Appl. No. 12/533,786, filed Jul. 31, 2009.
Unpublished U.S. Appl. No. 12/853,978, filed Aug. 10, 2010.

* cited by examiner

*Primary Examiner* — Troy Chambers
*Assistant Examiner* — Michael Gonzalez
(74) *Attorney, Agent, or Firm* — Neal, Gerber & Eisenberg, LLP

(57) ABSTRACT

A drive device comprising improved components is described. The drive device may be of various known types that require the use of a steering clutch and a reduction gear set. The drive device may be applied to, but is not limited to, a walk-behind vehicle that may include a snow thrower or blower.

15 Claims, 18 Drawing Sheets

DRIVE DEVICE

CROSS REFERENCE

This application claims the priority of U.S. Provisional Patent Application Ser. No. 61/085,612 filed on Aug. 1, 2008, the terms of which are incorporated herein by reference in its entirety.

BACKGROUND OF THE INVENTION

This application is related to drive devices for a variety of vehicles.

SUMMARY OF THE INVENTION

The present invention provides a drive device for a variety of vehicles.

A better understanding of the properties of the invention will be obtained from the following detailed description and accompanying drawings which set forth one or more illustrative embodiments and are indicative of the various ways in which the invention may be employed.

DETAILED DESCRIPTION OF THE DRAWINGS

Figure 1:
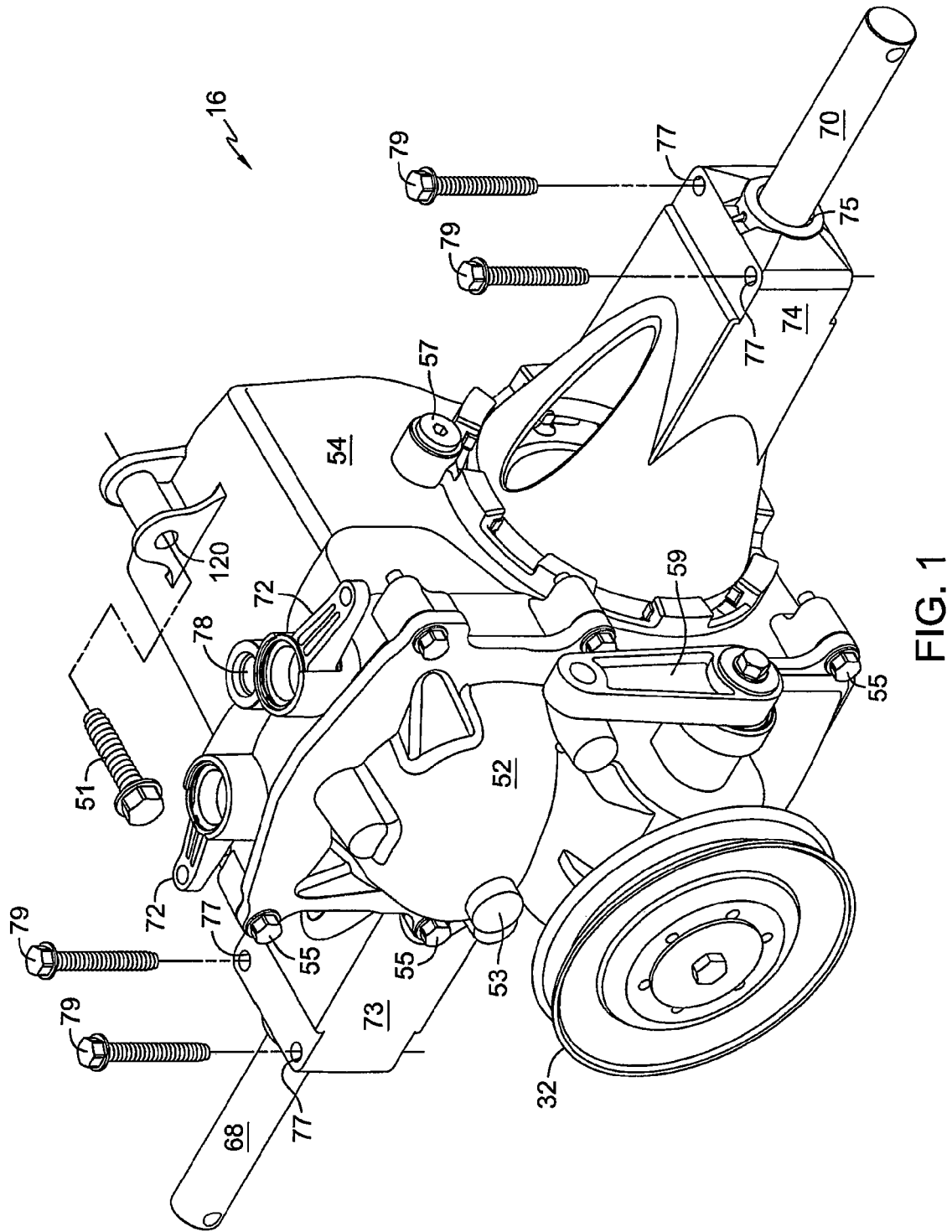
FIG. 1 is a perspective view of a first embodiment of a hydraulic drive device in accordance with the present invention.
Figure 2:
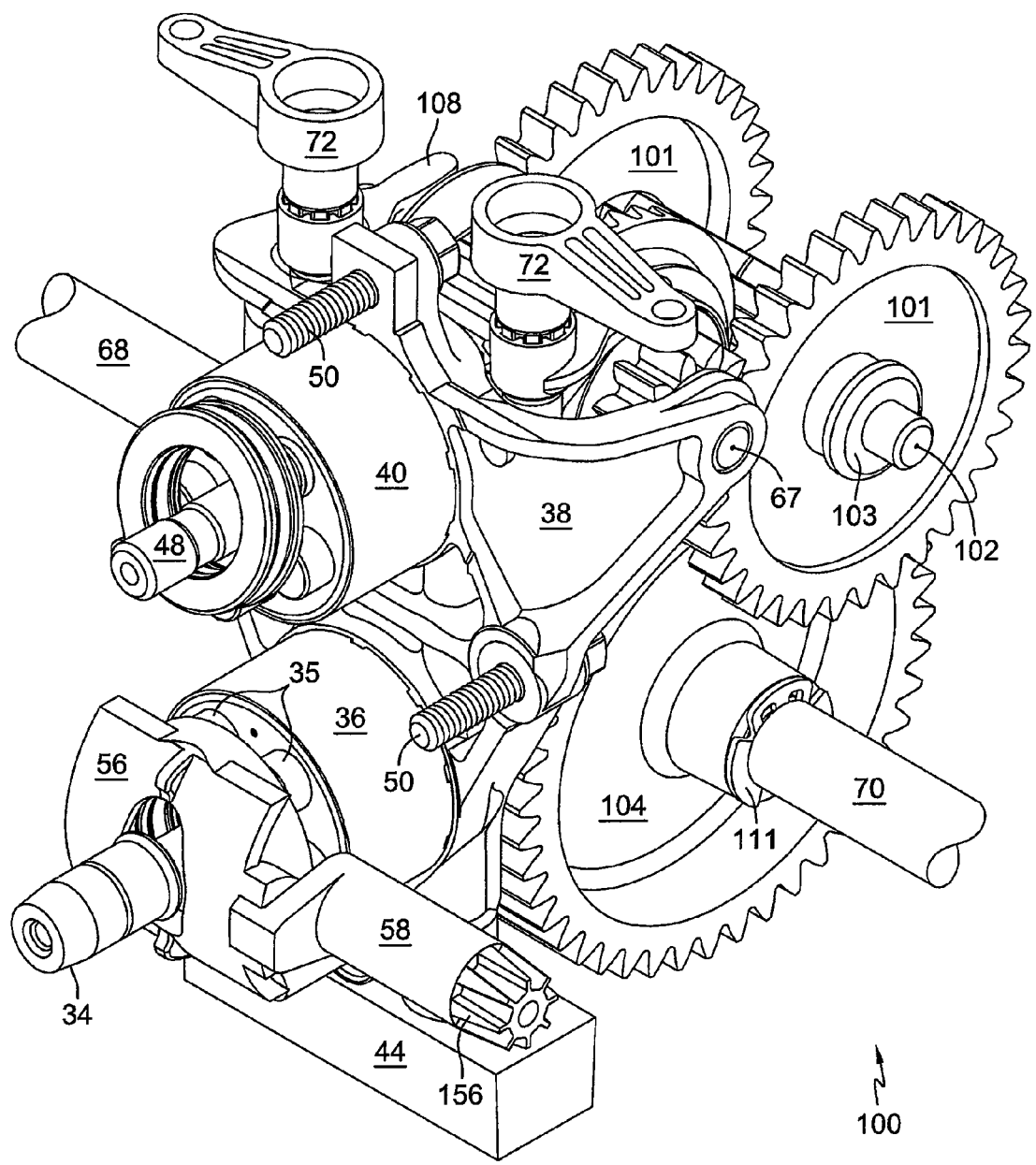
FIG. 2 is a perspective view of the hydraulic drive device shown in FIG. 1 with the housings removed.
Figure 3:
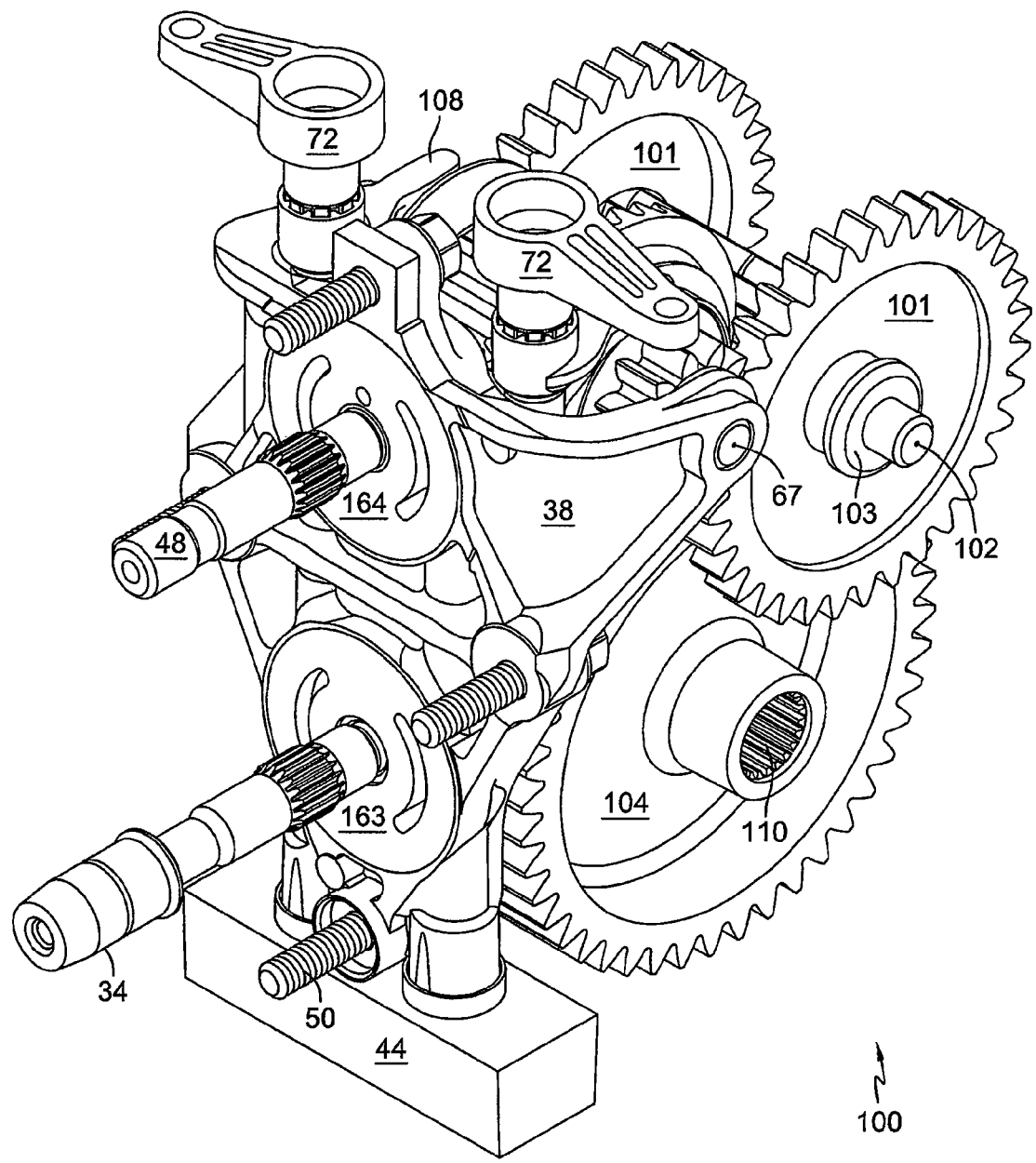
FIG. 3 is a perspective view of the portion of the hydraulic drive device shown in FIG. 1 with certain items removed for clarity.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles. The scope of the present invention is intended to cover all such embodiments that may fall within the scope of the appended claims, either literally or under the doctrine of equivalents.

The embodiments of drive device 16 disclosed herein may be used in a variety of vehicles such as a walk-behind snow thrower or other such vehicles. However, the embodiments disclosed herein are not limited to use in this type of vehicle.

Drive device 16 is depicted in detail in FIGS. 1-14. Drive device 16 is shown as a type of continuously variable hydraulic or hydrostatic transmission of a type known as an integrated hydrostatic transmission. Such transmissions are well known in the art and will only generally be described herein. Moreover, it will be appreciated by those in the art that the scope of the present invention is not limited to hydraulic transmissions, but may include any type of continuously variable transmission.

Drive device 16 is powered by a prime mover (not shown), and, in the depicted embodiment, drives input shaft 34 by way of a belt and pulley system. For convenience, only pulley 32 of the belt and pulley system is shown. Input shaft 34 is engaged to and drives hydraulic pump 36, which is rotatably disposed on pump running surface 163 of center section 38. Motor 40 is rotatably disposed on motor running surface 164, formed on motor mounting portion 174. Hydraulic pump 36 is hydraulically connected to motor 40 through internal porting 165, which is formed in center section 38 and connects pump running surface 163, formed on pump mounting portion 175, with motor running surface 164.

Center section 38 may have a plurality of other components installed therein or thereon to aid in the operation of drive device 16, such as valves 42 (seen, for example, in FIG. 6) that may comprise check valves, combination valves that include check, neutral, pressure rise rate, or relief functions, bypass valves or other types of valves. Valves 42 may each comprise a seat or body 43 that is pressed into a port in center section 38 that communicates with internal porting 165 of center section 38. Depending on the operating conditions of drive device 16, additional retention of body 43 may be provided. Thus, center section 38 may be configured to permit staking of body 43 in place, or a retaining ring (not shown) or other element may be located adjacent body 43 to keep the pressure conditions of the internal porting of center section 38 from pushing body 43 out of center section 38.

Figure 6:
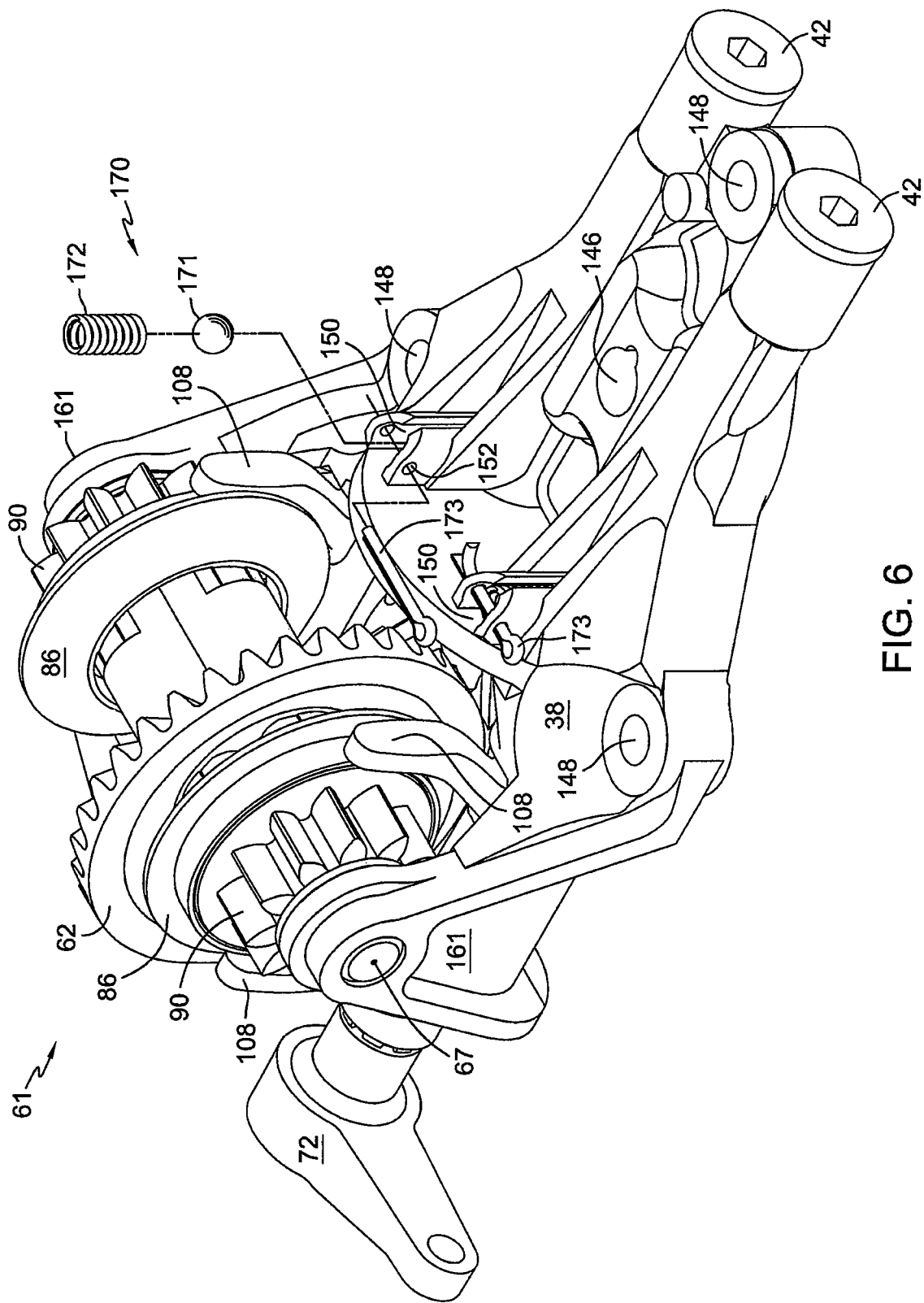
FIG. 6 is an opposite perspective view of the portion of the hydraulic drive device shown in FIG. 5 with the filter removed and a shock valve assembly shown in exploded format.

As shown in FIG. 6, center section 38 may also include one or more shock valves 170. In the depicted embodiment, shock valves 170 comprise a ball 171 and spring 172, both of which are installed in pocket 150 and retained with cotter pin 173, installed through openings 152. As is known in the art, the purpose of this type of valve is to prevent system fluid pressure spikes from causing damage to moving parts interfaces, such as gears, bearings or cylinder block running faces. By way of example, and in no way limiting, a pressure spike may cause hydraulic pump 36 or hydraulic motor 40 to temporarily lift off from center section 38, possibly causing damage to pump running face 163 or motor running face 164. In an application such as a walk-behind snow thrower, this kind of pressure spike is much more likely to occur when driving the snow thrower forward into heavy snow or against an obstruction, and is unlikely to occur during reverse operation. Thus, under certain operating conditions, only one shock valve 170 may be required, which would be placed on the fluid side of the hydraulic circuit that is under high pressure when the vehicle is operating in the forward direction.

Other elements located on or in center section 38 may include filter 44 and fasteners 50. As seen, for example, in FIG. 3, fasteners 50 extend parallel to shaft 34 and shaft 48 to support center section 38 in a sump (not shown) formed by first housing 52 and second housing 54. Note that such center section and fastener configurations are known in the art. For example, U.S. Pat. No. 5,392,670 to Hauser, incorporated herein by reference in its entirety, shows a center section 62 installed within a housing element. Unnumbered fasteners holding center section 62 to a housing element are readily seen in FIGS. 1, 3 and 5 of the '670 patent. A person of skill in the art would recognize that similar fasteners hold center section 62 to a housing element in FIG. 6 of the '670 patent.

A swash plate such as swash plate 56 is provided to control the displacement of pump 36. Thus, as swash plate 56 is moved by trunnion arm 58, the displacement of pump pistons 35 in pump 36 changes, causing fluid to flow through the internal porting 165 of center section 38 to motor 40, causing motor 40 to rotate. Trunnion arm 58 may be moved manually by a control arm 59 or by an electronic or hydraulic control, as is known in the art. Examples of electronic controls that could be used in connection with the present invention may be found in U.S. Pat. No. 7,073,330 and Pub. No. 2008/0018269, both of which are commonly owned with this invention and incorporated herein by reference in their entireties.

Figure 4:
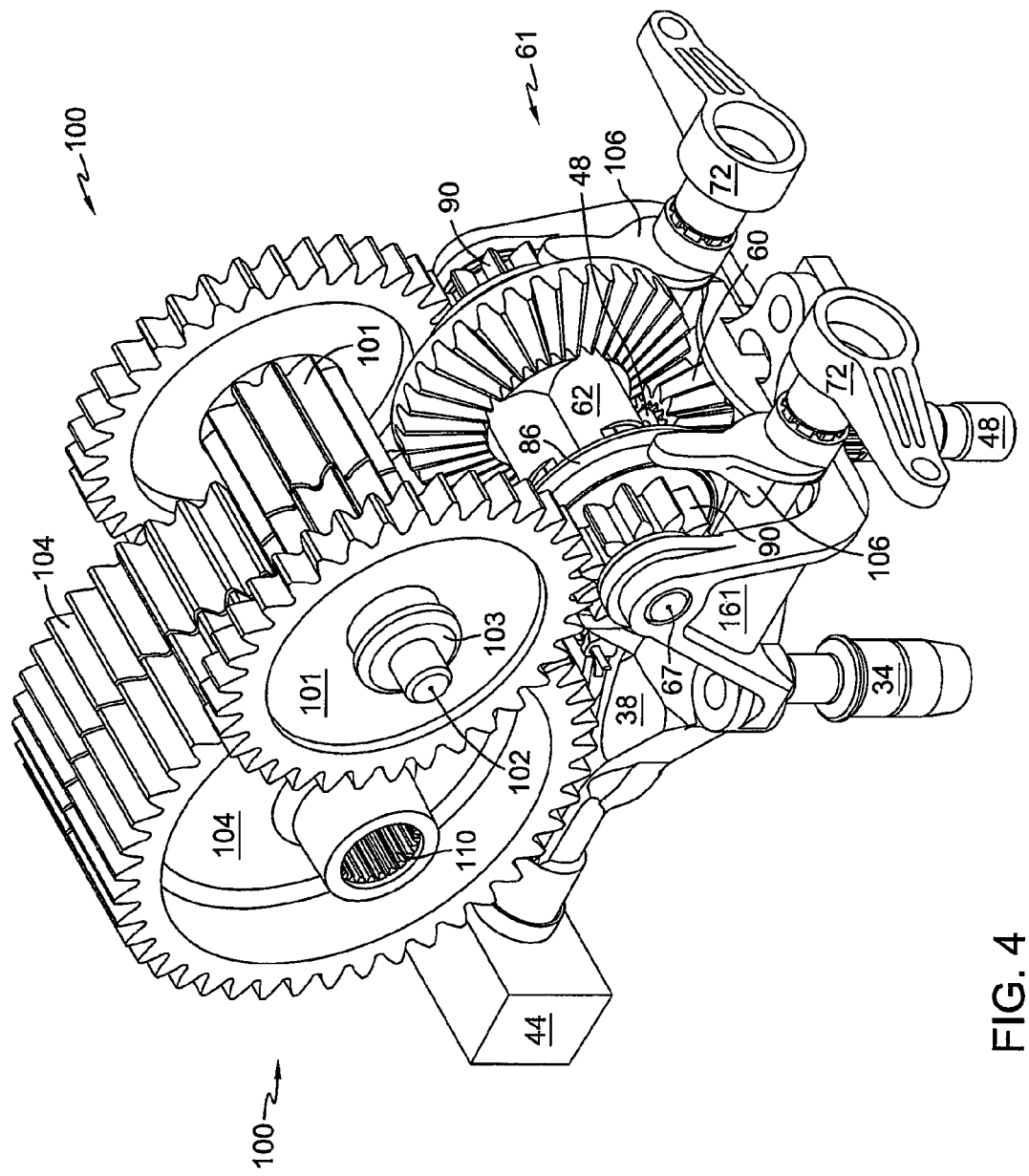
FIG. 4 is an opposite perspective view of the portion of the hydraulic drive device shown in FIG. 3, with certain items removed for clarity.
Figure 5:
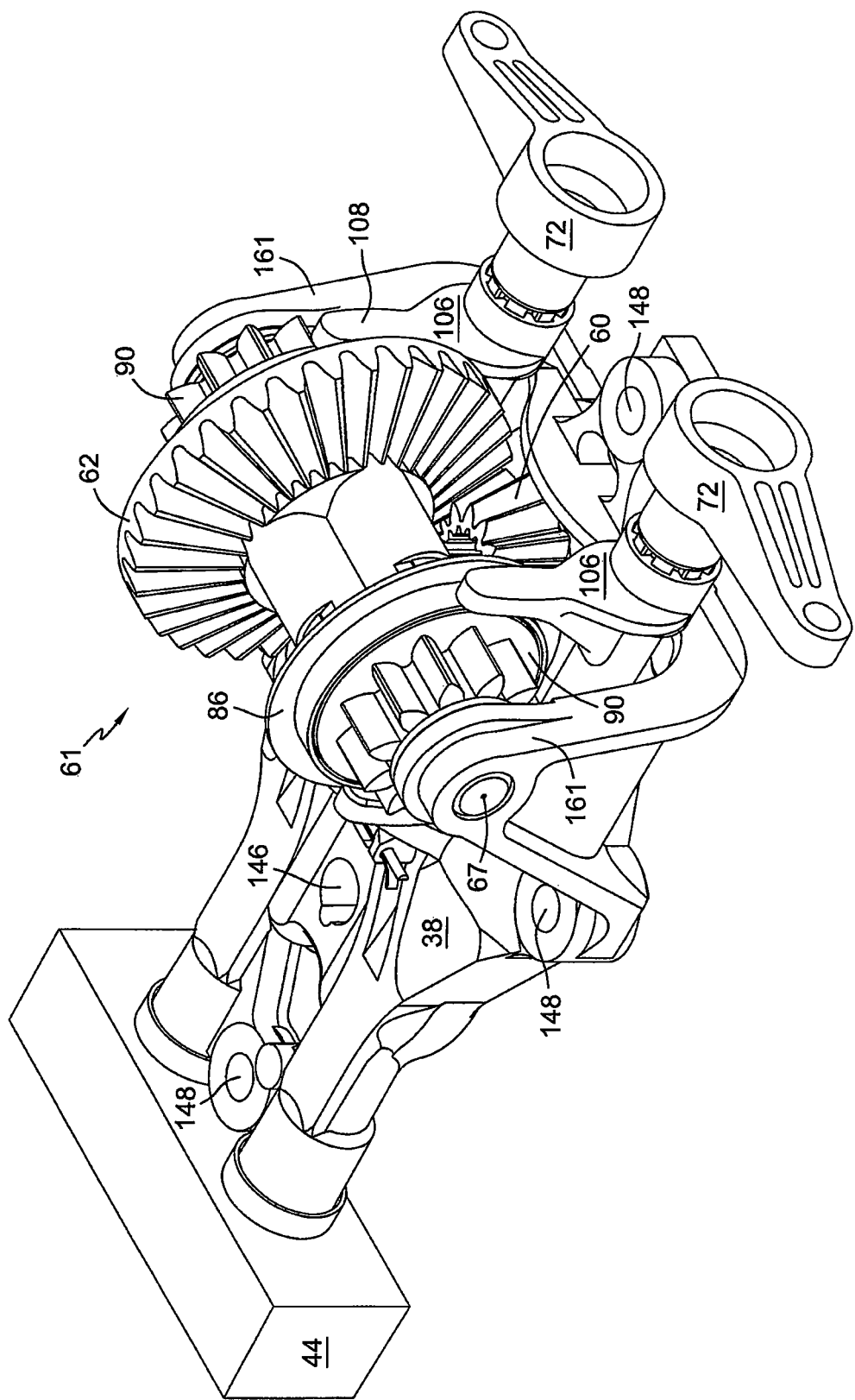
FIG. 5 is a perspective view of the portion of the hydraulic drive device shown in FIG. 4 with the reduction gear set removed.
Figure 10:
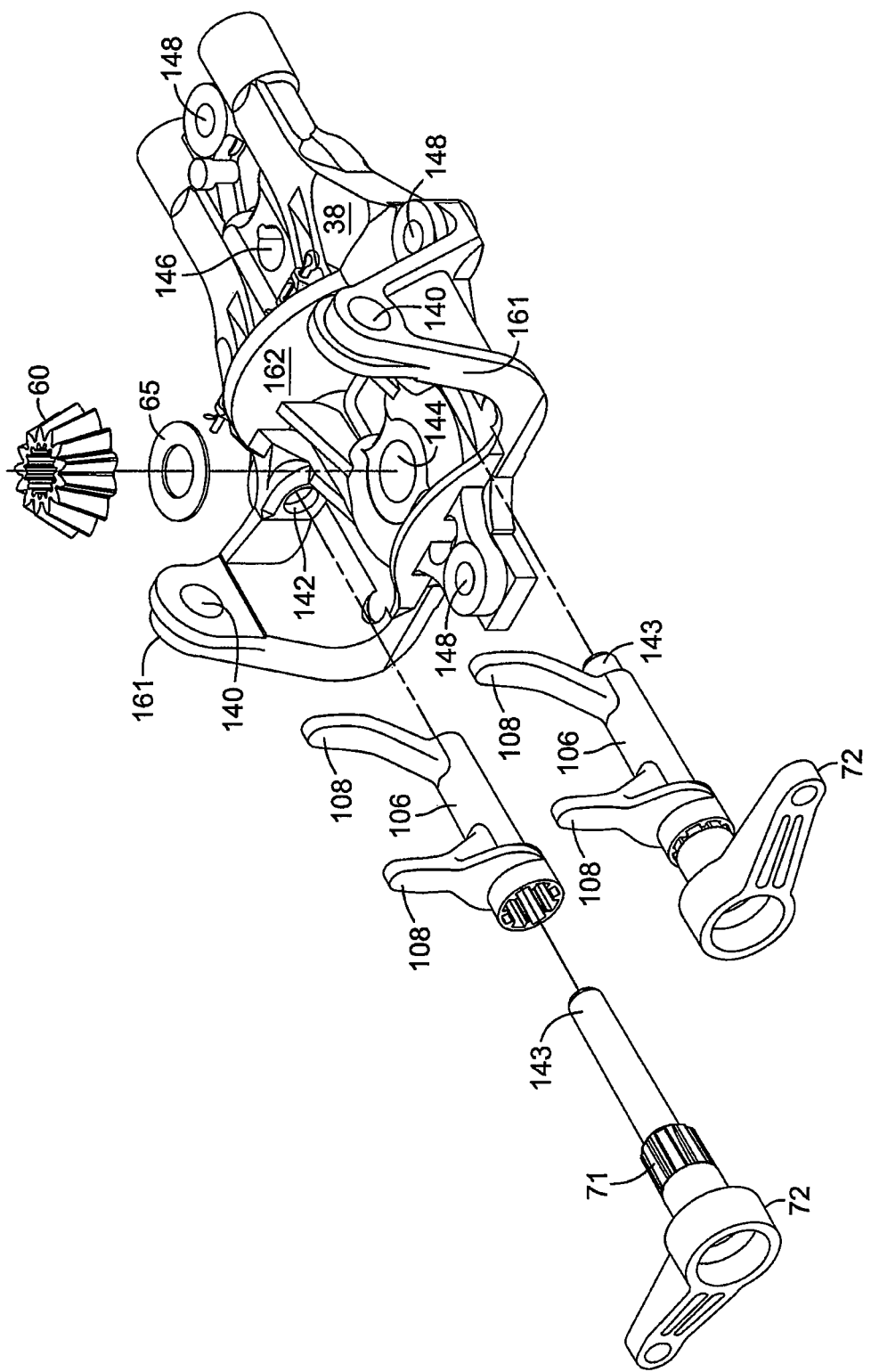
FIG. 10 is an exploded perspective view of the center section, clutch actuators, pinion gear and wear washer of the hydraulic drive device shown FIG. 1.

Motor 40 drives output shaft 48. As shown in FIG. 4, output shaft 48 has a pinion bevel gear 60 mounted thereon. Output shaft 48 passes through and is supported by opening 144 in center section 38. The end of shaft 48 opposite bevel gear 60 is supported by housing 52 and may include a thrust washer or disc (not shown) installed in shaft support 53 of housing 52 to prevent excessive wear to housing 52. As shown in FIG. 10, pinion gear 60 may rotate on wear washer 65 to prevent excessive wear to center section 38.

As output shaft 48 rotates, pinion gear 60 drives clutch gear 62. Located on either side of clutch gear 62 are rings 86, which are part of clutch assembly 61, the operation of which is described in detail below. As a preliminary matter, both rings 86 are biased by springs 80 to the engaged position, and an arm 72, in conjunction with a fork 106, is positioned proximate to each ring 86, and may rotate to move rings 86 to the disengaged position, independent of one another. Each ring 86 is associated with one of shafts 68 or 70 through a separate gear train. By allowing for individual engagement and disengagement of the rings 86, individual control of shafts 68 and 70 may be provided, allowing drive device 16 to both steer and propel a vehicle comprising drive device 16.

Figure 7:
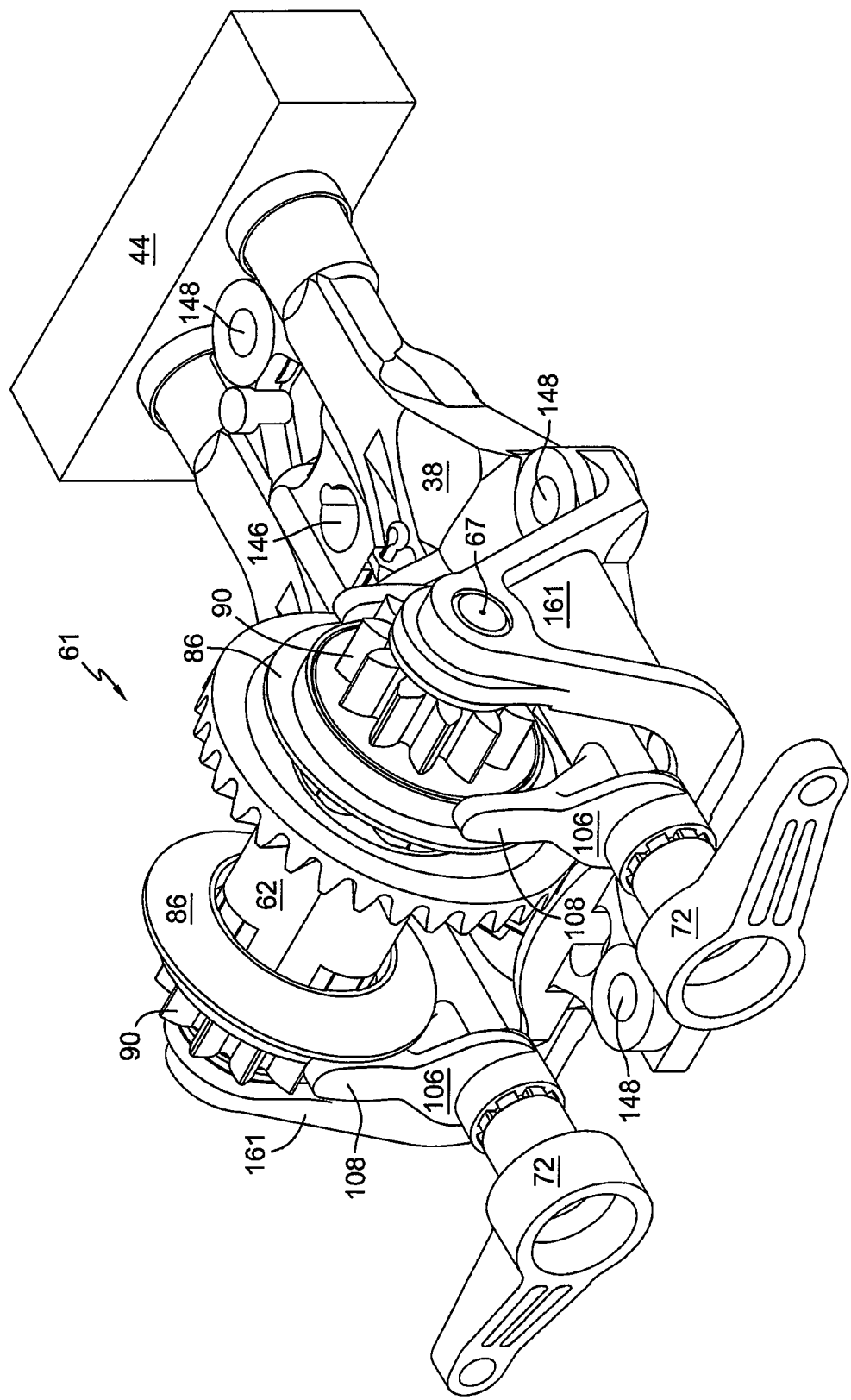
FIG. 7 is a perspective view of the portion of the hydraulic drive device shown in FIG. 6 rotated 90 degrees clockwise.
Figure 8:
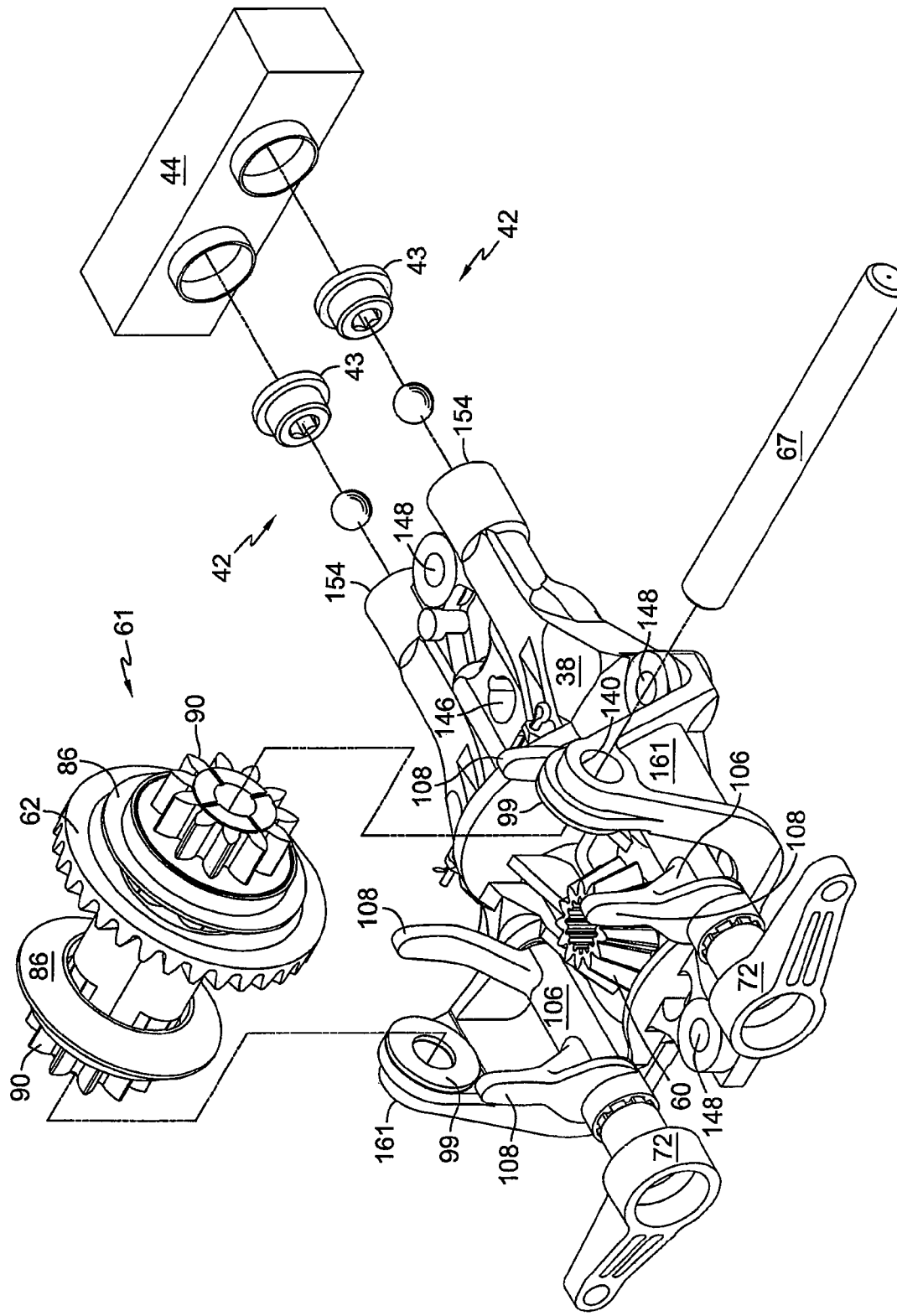
FIG. 8 is a perspective view of the portion of the hydraulic drive device shown in FIG. 7 with the assembled clutch and certain other elements shown exploded format.
Figure 9:
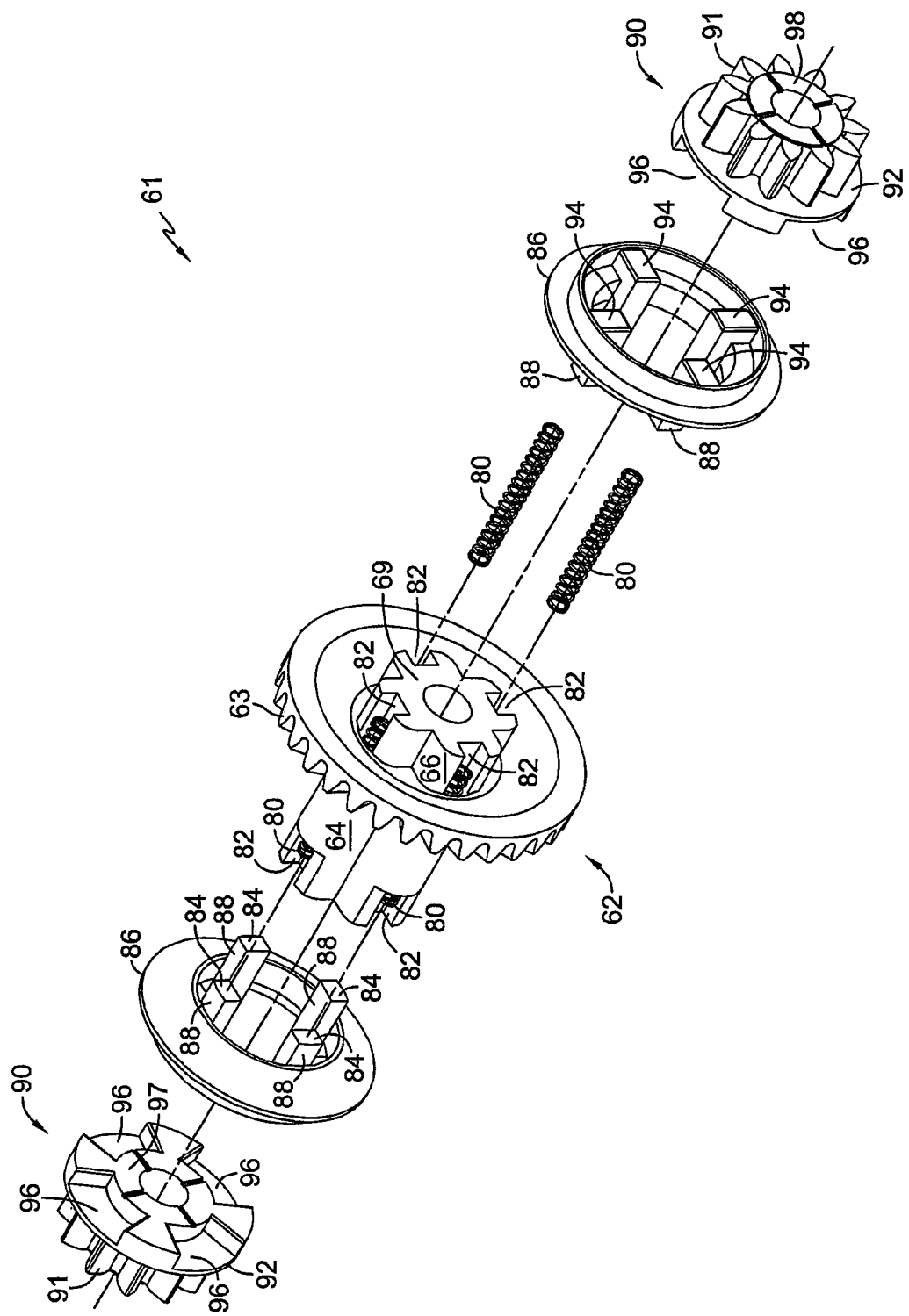
FIG. 9 is an exploded perspective view of the clutch assembly of the hydraulic drive device shown in FIG. 1.

As stated above, steering of a vehicle is accomplished by use of clutch assembly 61, which is shown in detail in FIGS. 7-9.

In FIGS. 4-7, both rings 86 of clutch assembly 61 are shown in the engaged position. In this position, clutch gear 62 provides motive power to rotate both flange gears 90. Each flange gear 90 is, in turn, engaged to a reduction gear set 100, as seen, for example, in FIG. 4. In the depicted embodiment, each reduction gear set 100 includes a reduction spur gear 101 and a spur gear 104. Each spur gear 104 is connected to one of axle shaft 68 or 70 by splines 110.

Jack shaft 102 supports the pair of reduction spur gears 101. Cupped washers 103 are used near each end of jack shaft 102 to prevent the hubs of gears 101 from cutting into housing 54. Jack shaft 102 is retained by plugs 57 installed in each side of housing 54.

As shown in FIG. 9, clutch 61 includes a centrally located clutch gear 62, which includes a bevel gear portion 63, which is driven by pinion bevel gear 60 whenever the prime mover is operating and providing input to drive device 16, and trunnion arm 58 is rotated out of the neutral band in either a forward or reverse direction. For purposes of this description, the neutral band is defined as a pump displacement zone at or near zero displacement in which motive force provided by pump 40 and motor 36 is not sufficient to cause rotation of axle 68 or 70 during normal vehicle operating conditions.

Rings 86 are engaged to bevel gear 62 such that each ring 86 rotates whenever gear 62 rotates. When a ring 86 is engaged with a flange gear 90, spur gear portion 91 of gear 90 drives its related reduction spur gear 101, which drives its related spur gear 104, thereby rotating axle 68 or 70, respectively.

As best shown in FIGS. 7-9, each ring 86 is biased toward engagement with its respective mating flange gear 90 by the force of a plurality of springs 80, each located in an opening 82 of housing portion 64 of clutch gear 62. In order to remove the motive force from one or both of axles 68 or 70, an arm 72 is rotated by the vehicle operator. Because fork 106, which comprises tines 108, is splined to arm 72, rotation of arm 72 causes the tines 108 to engage the respective ring 86, moving ring 86 away from its respective flange gear 90. This movement causes protrusions 94 of ring 86 to disengage from recesses 96 formed in flange portion 92 of flange gears 90, thereby disconnecting the driving force from flange gear 90.

Simultaneous contact of both ends of all springs 80 is continuously maintained with surfaces 84 of protrusions 88 on rings 86. Protrusions 88 formed on rings 86 slidingly engage slots 82 and retain springs 80 within the fully enclosed portion of slots 82. Space is provided in the interface between slots 82 and protrusions 88 to allow fluid to flow freely through slots 82 when one or both rings 88 are pushed toward gear portion 63.

Clutch support shaft 67 is installed through openings 140 in arms 161 of center section 38. Clutch assembly 61 is rotatably mounted on shaft 67, which may be identical to jack shaft 102. Inner surfaces of arms 161 may be machined to ensure correct spacing of clutch 61 components and preload on springs 80. Wear washers 99 located adjacent to inner surfaces of arms 161 interface with grooved outer end surfaces 98 of gears 90. Grooves in surfaces 98 ensure adequate lubrication of these mating surfaces, which are pushed into rotating contact with one another by forces applied by springs 80 and transferred through rings 86. Inner end surfaces 97 of gears 90 are also grooved, since they come into rotating contact with end surfaces 69 of gear 62.

Once force is removed from handle 72, or alternatively, if handle 72 is returned to its original position, springs 80 will then act on surfaces 84 to slide ring 86 toward gear 90, thus permitting protrusions 94 to reengage recesses 96. Since rings 86 are continuously driven by gear 62, reengagement of protrusions 94 with recesses 96 in gears 90 will cause axle shaft 68 or 70 to rotate.

It will be appreciated by those in the art that recesses 96 of gears 90 are larger than protrusions 94 of rings 86. This sizing is necessary to ensure clutch engagement when rings 86 are rotating and gears 90 are not rotating or are rotating more slowly than rings 86.

If both arms 72 are rotated out of their original positions at the same time, neither axle will be driven. If both arms 72 are returned to their original positions, both axles will be driven. If only one arm 72 is rotated out of its original position, only its associated axle will be drivingly disconnected, causing the vehicle to turn.

Arm 72 interfaces with fork 106 by way of splines 71. The relatively large size of these elements allows distribution of stresses over a large area, permitting plastic to be used for both handle 72 and fork 106.

A first embodiment of center section 38 is shown in detail in, e.g., FIGS. 2-8 and 10-14. Pump input shaft 34, motor output shaft 48 and clutch actuator arms 72 are all partially supported by center section 38. Opening 146 supports one end of shaft 34, while opening 144 supports one end of shaft 48. Openings 142 support ends 143 of arms 72 which, in turn, support actuator forks 106. Clutch 61 is entirely supported on shaft 67 which is installed through openings 140 in clutch support arms 161 of center section 38.

Figure 11:
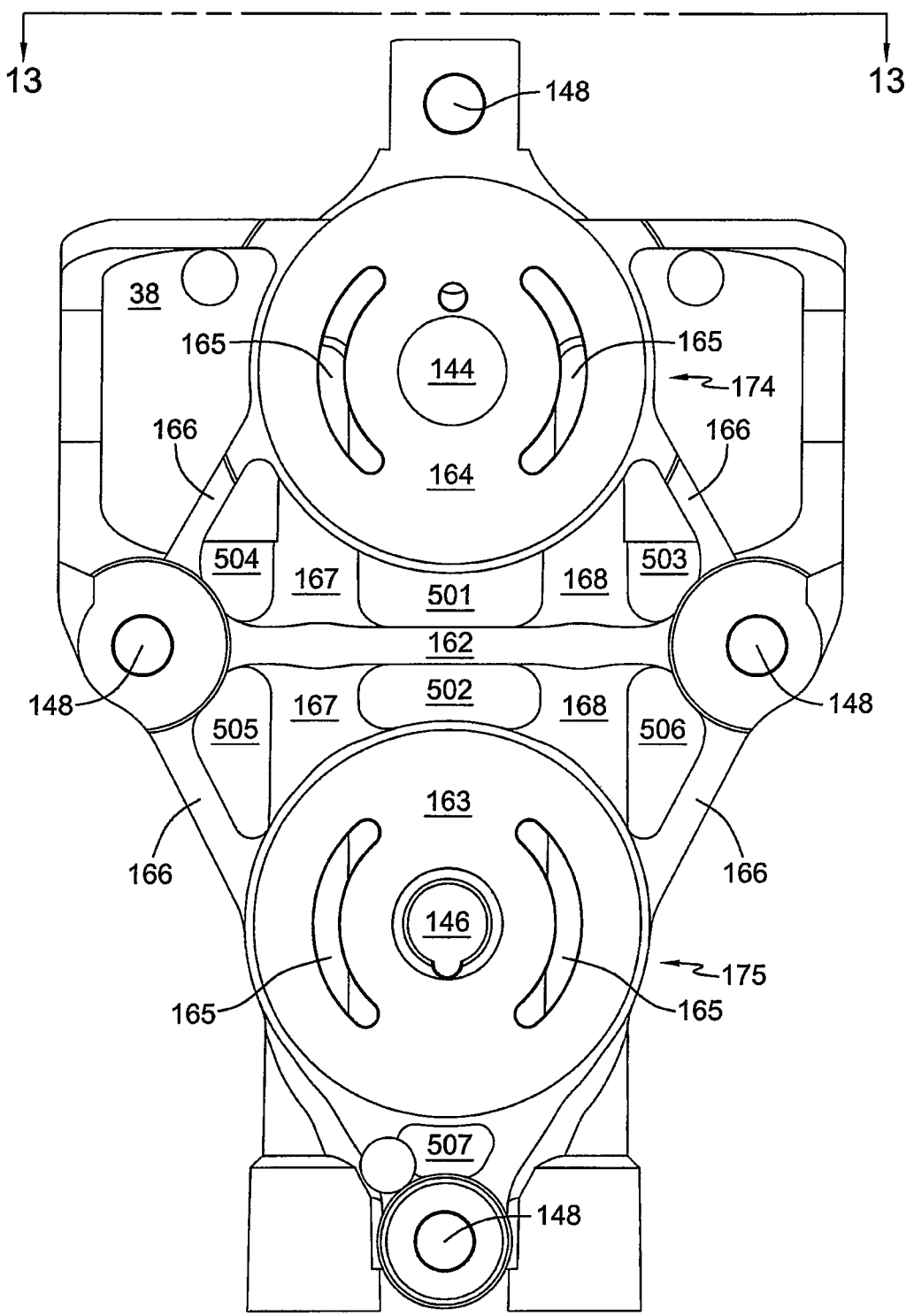
FIG. 11 is an elevational view of the hydraulic cylinder block running surfaces side of the center section of the hydraulic drive device shown in FIG. 1.
Figure 12:
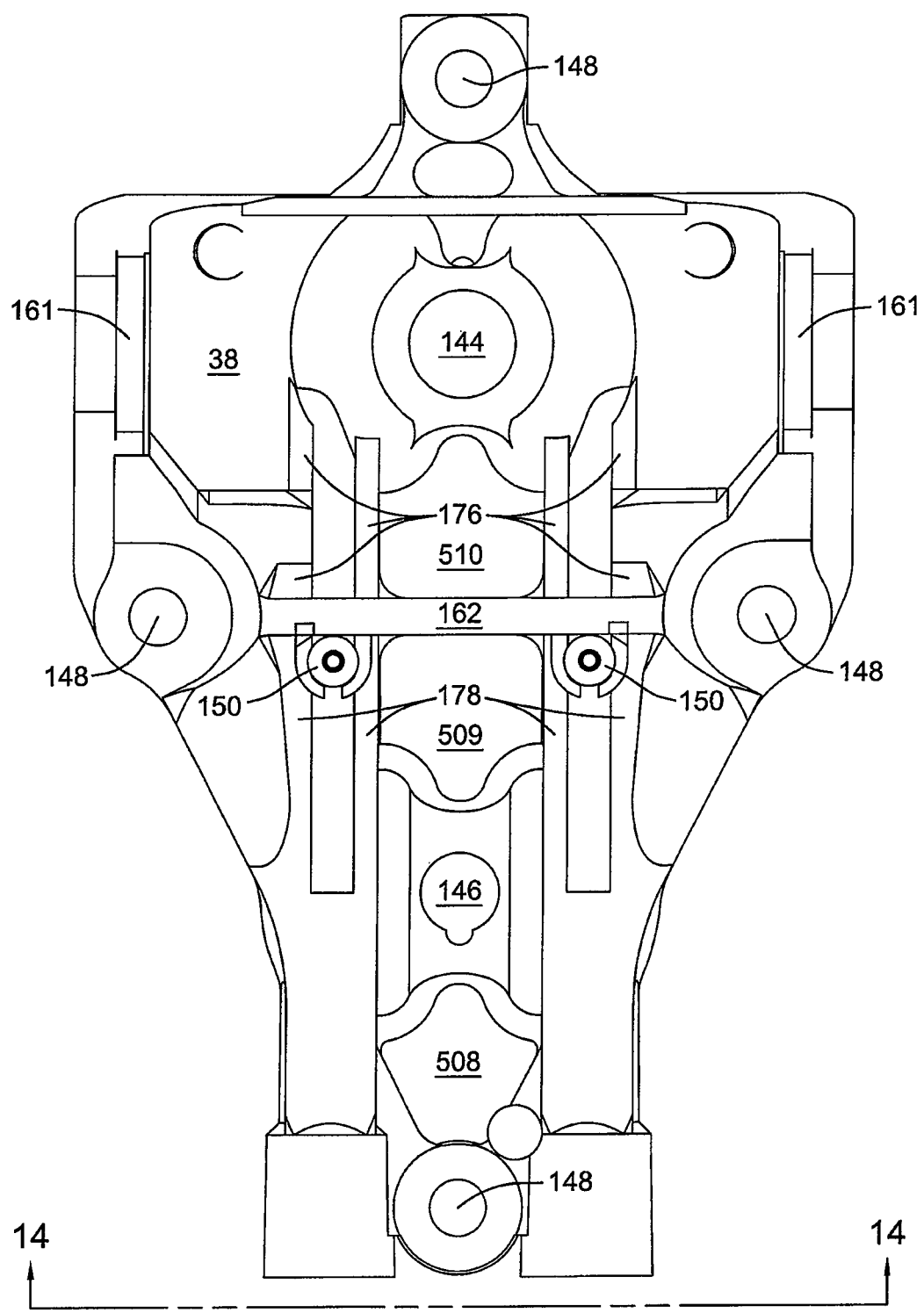
FIG. 12 is an elevational view of the reverse side of the center section shown in FIG. 11.
Figure 13:
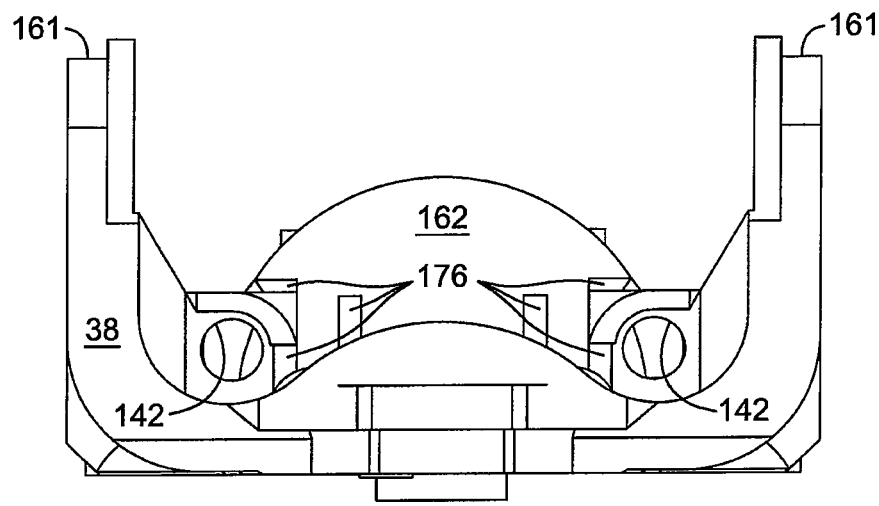
FIG. 13 is a top plan view of the center section shown in FIG. 11 along the lines 13-13.
Figure 14:
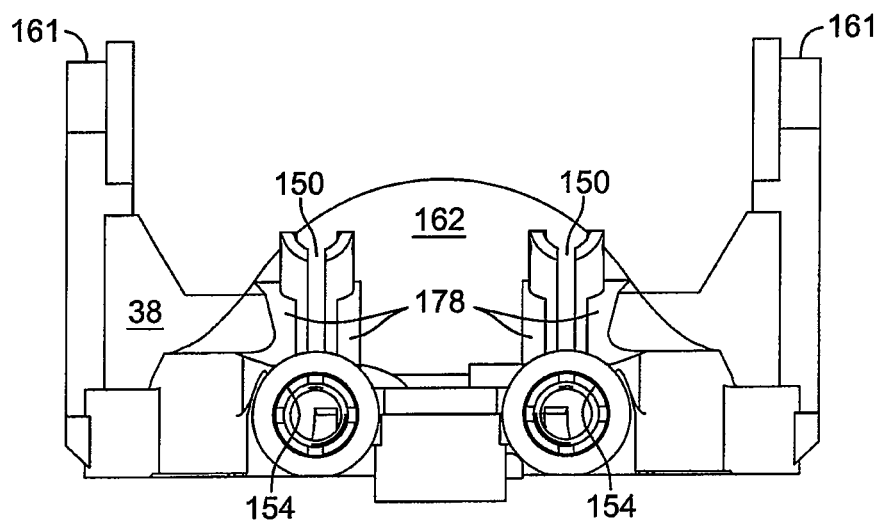
FIG. 14 is a bottom plan view of the center section shown in FIG. 12 along the lines 14-14.
Figure 15:
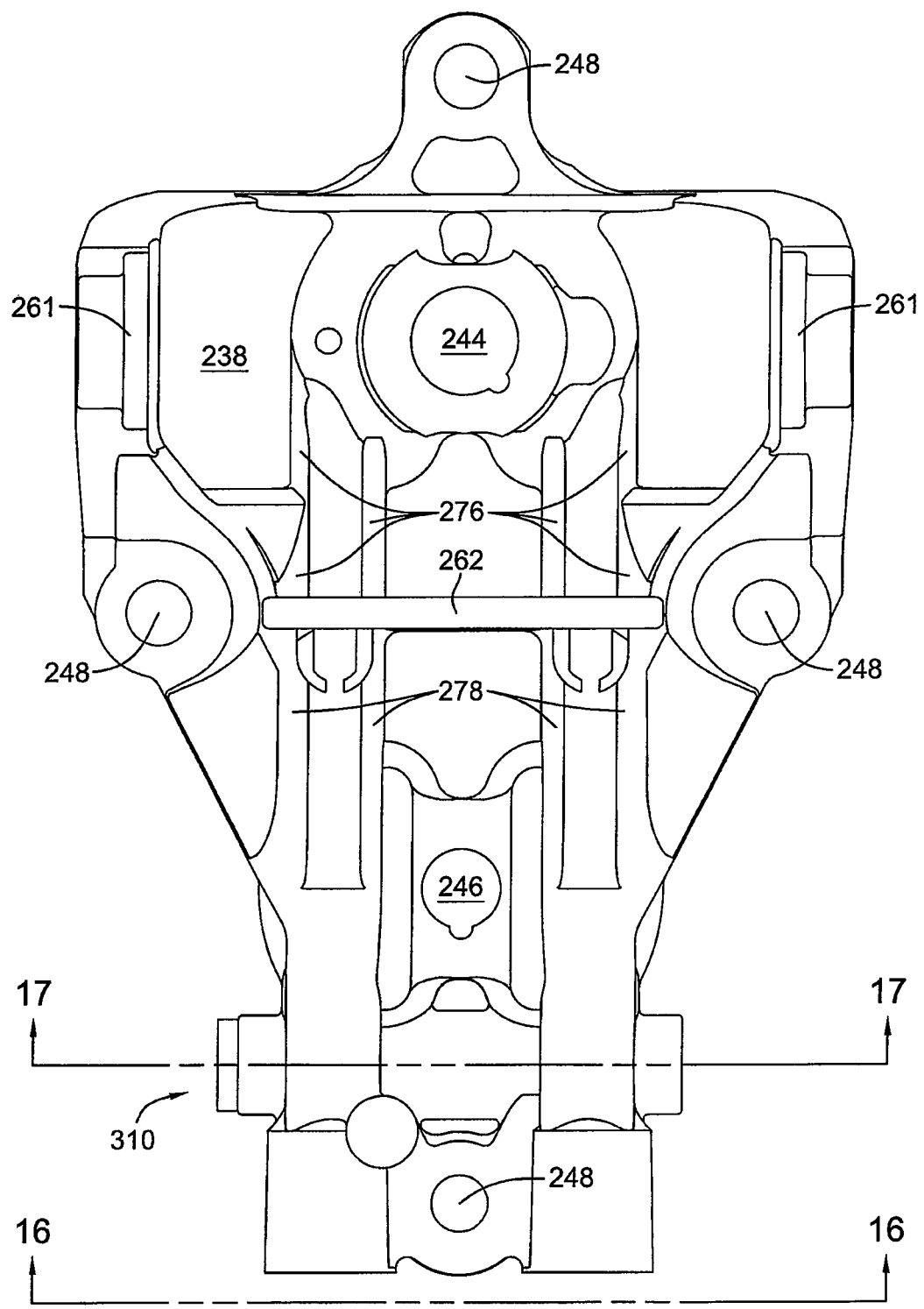
FIG. 15 is an elevational view of a second embodiment of a center section.

In order to provide a strong and rigid center section, a diamond-shaped mounting pattern is utilized in conjunction with a diamond-shaped reinforcement rib pattern. Four fasteners 50 are inserted through openings 148 to secure center section 38 to housing 52, providing a rigid subassembly of these components. A central strengthening rib 162 and four additional ribs 166 form a double triangular pattern within an overall diamond pattern. Specifically, as seen in FIG. 11, two ribs 166 extend from proximate an opening 148 to motor mounting portion 174, and two ribs 166 extend from proximate an opening 148 to pump mounting portion 175. This double triangular pattern serves to structurally isolate running faces 163 and 164 from one another and from stresses transferred from clutch 61. Specifically, as will be obvious to those in the art, the axes of rotation of pump 36 and motor 40 define a first plane, and central strengthening rib 162 is disposed perpendicular to that first plane. Note that three fasteners arranged in a surrounding triangular pattern are associated with each running face. Fluid passage structures 167 and 168, in combination with central rib 162 and buttressing ribs 176 and 178, form a sturdy H-shaped central structure to further strengthen, stiffen, and help maintain flatness of center section 38. Finally, because of the support provided by the H-shaped central structure and the overall diamond pattern, center section 38 can be manufactured with significantly less material than other center sections. By way of example, center section 38 comprises several areas 501 to 510 that either lack any material, or have a substantially reduced amount of material. By way of example, in the depicted embodiment, a thin webbing of material separates area 501 from area 510, area 502 from area 509 and area 507 from area 508. It will be appreciated by those in the art that this thin webbing may be removed, thus making areas 501 and 510, areas 502 and 509 and areas 507 and 508 each one space that lacks material.

Easily accessible valve openings 154 are provided for installation of valves 42 in center section 38. Filter 44 is easily installed over valves 42. Central strengthening rib 162 forms one side of pockets 150 so that minimal material is used to form pockets 150. Installation of valves 170 in pockets 150 is also very simple. Note that push-lock pins (not shown) may be used in lieu of cotter pins 173 to further simplify assembly of valves 170 by avoiding the cotter pin bending operation. It will also be appreciated by those in the art that, when used in certain applications, valves 170 may not be needed, and, as such, pockets 150 may not be included.

A second embodiment of a center section of the present invention is disclosed in FIGS. 15-18. As seen, center section 238 comprises many features that are similar to center section 38. Features which are substantially similar or identical to those previously described will not be described in detail, but are designated by similar numerals using the initial number "2." First port 302 and second port 304 can be seen in, e.g., FIG. 18, and are used to fluidly connect a pump, such as pump 36, to a motor, such as motor 40. Cross channel 306 may be provided to connect first port 302 and second port 304.

Figure 18:
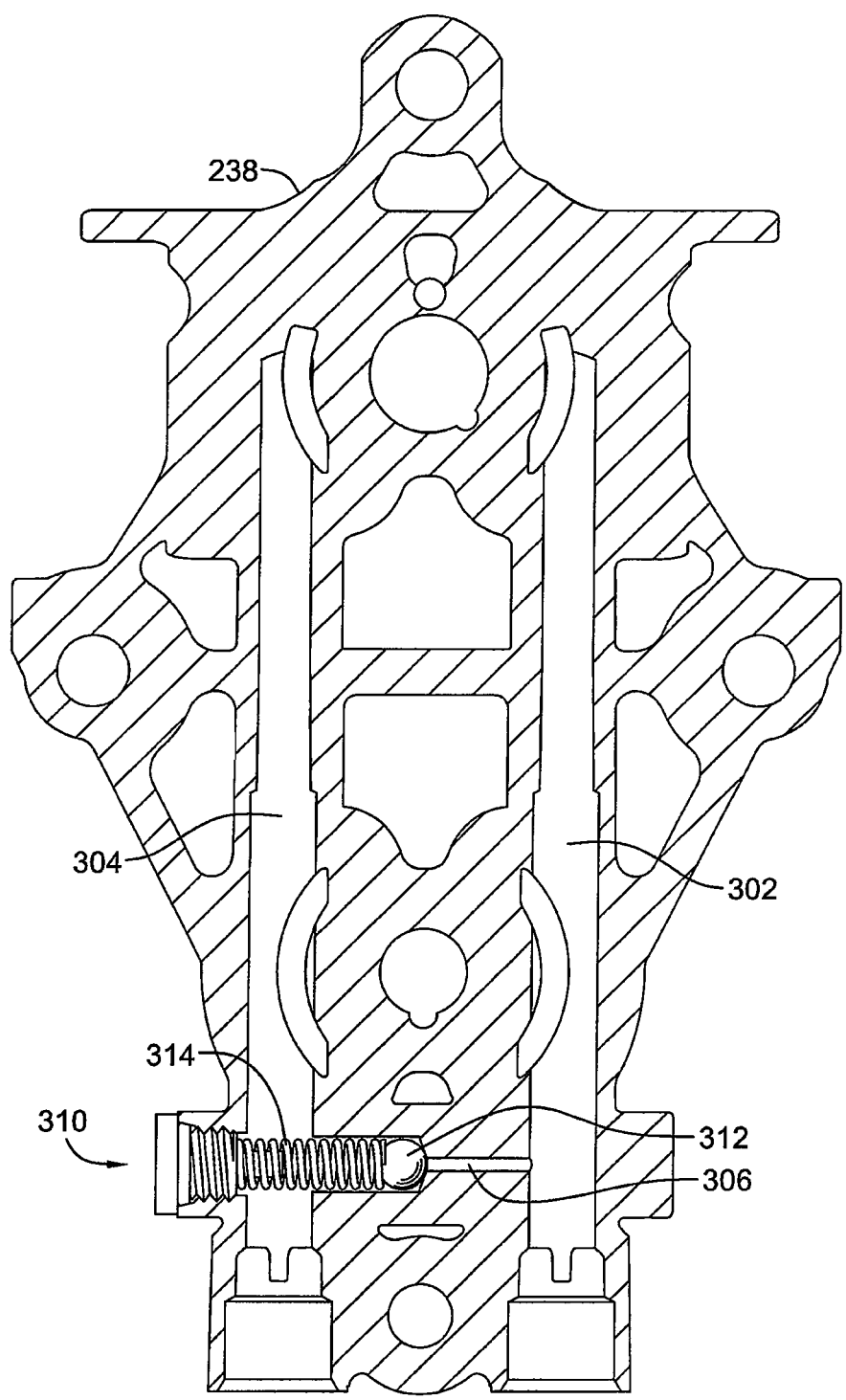
FIG. 18 is a cross-sectional view of the center section shown in FIG. 15, along the lines 18-18 of FIG. 16.

It is well known in the art that, due to various operating conditions or circumstances, one side or another in a hydraulic circuit, such as the circuit displayed in FIG. 18, may experience sudden increases in hydraulic pressure. Cross channel 306 can be used to relieve such increases. In the embodiment depicted in FIGS. 17 and 18, valve 310 is a shock valve disposed in cross channel 306. Shock valves are generally well known in the art and will only briefly be described herein. If the hydraulic pressure in first port 302 increases past a set point, the hydraulic force acting on ball poppet 312 will exceed the force of spring 314 acting on ball poppet 312, and valve 310 will open to permit hydraulic fluid to flow from first port 302, to second port 304, lessening the hydraulic pressure. It will be appreciated by those in the art that, while valve 310 is depicted as a shock valve, other types of valves may be located in cross channel 306, depending on the capacity in which center section 238 is being used. By way of example only, valve 310 may be a combination check valve pressure relief valve, as disclosed in U.S. Pat. No. 7,367,353 which is incorporated herein in its entirety by reference.

Figure 16:
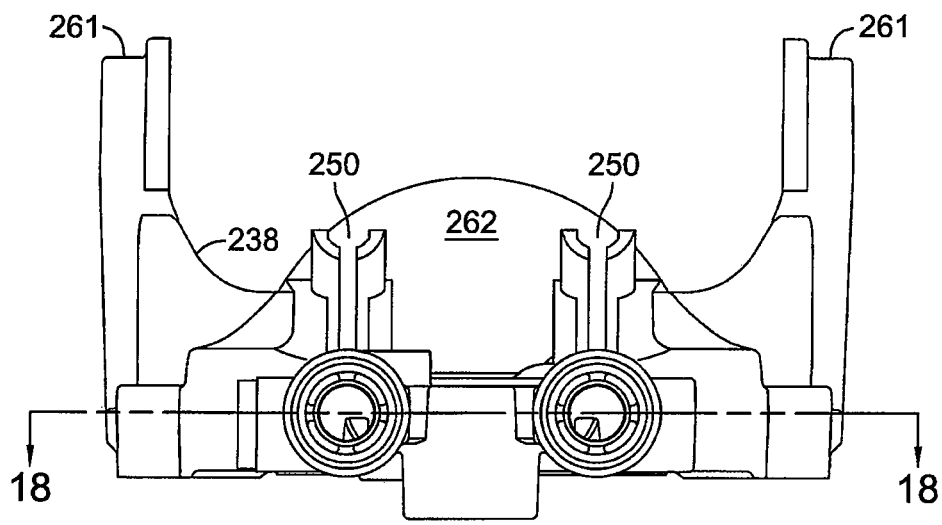
FIG. 16 is a bottom plan view of the center section shown in FIG. 15 along the lines 16-16 of FIG. 15.
Figure 17:
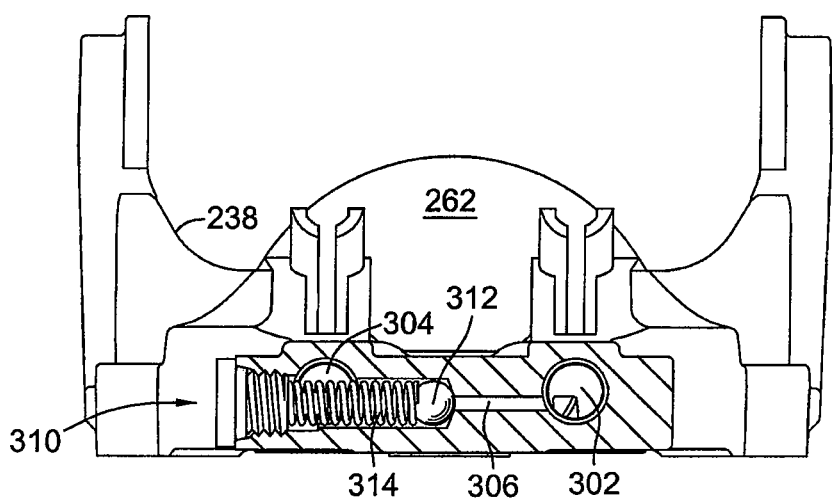
FIG. 17 is a cross-sectional view of the center section shown in FIG. 15, along the lines 17-17 of FIG. 15.

As in the first embodiment, when used in certain applications, some valves may not be needed, and, as such, pockets 250, as seen in FIG. 16, may be omitted from center section 238.

In a wheeled vehicle application or other application employing relatively long output shafts, each axle shaft 68 and 70 may require bearing support some distance from housing 54. Axle support housings 73 and 74 may provide locations for bearing support some distance from second housing 54, such as bearing support 75 shown in FIG. 1. Depending upon the material selected for axle support housings 73 and 74 and the anticipated loading of axles 68 and 70, bearing support 75 may be configured as a journal bearing or molded to receive a bushing or bearing. Axle support housings 73 and 74 may also provide fastener openings 77 to attach drive device 16 to a vehicle.

Figure 19:
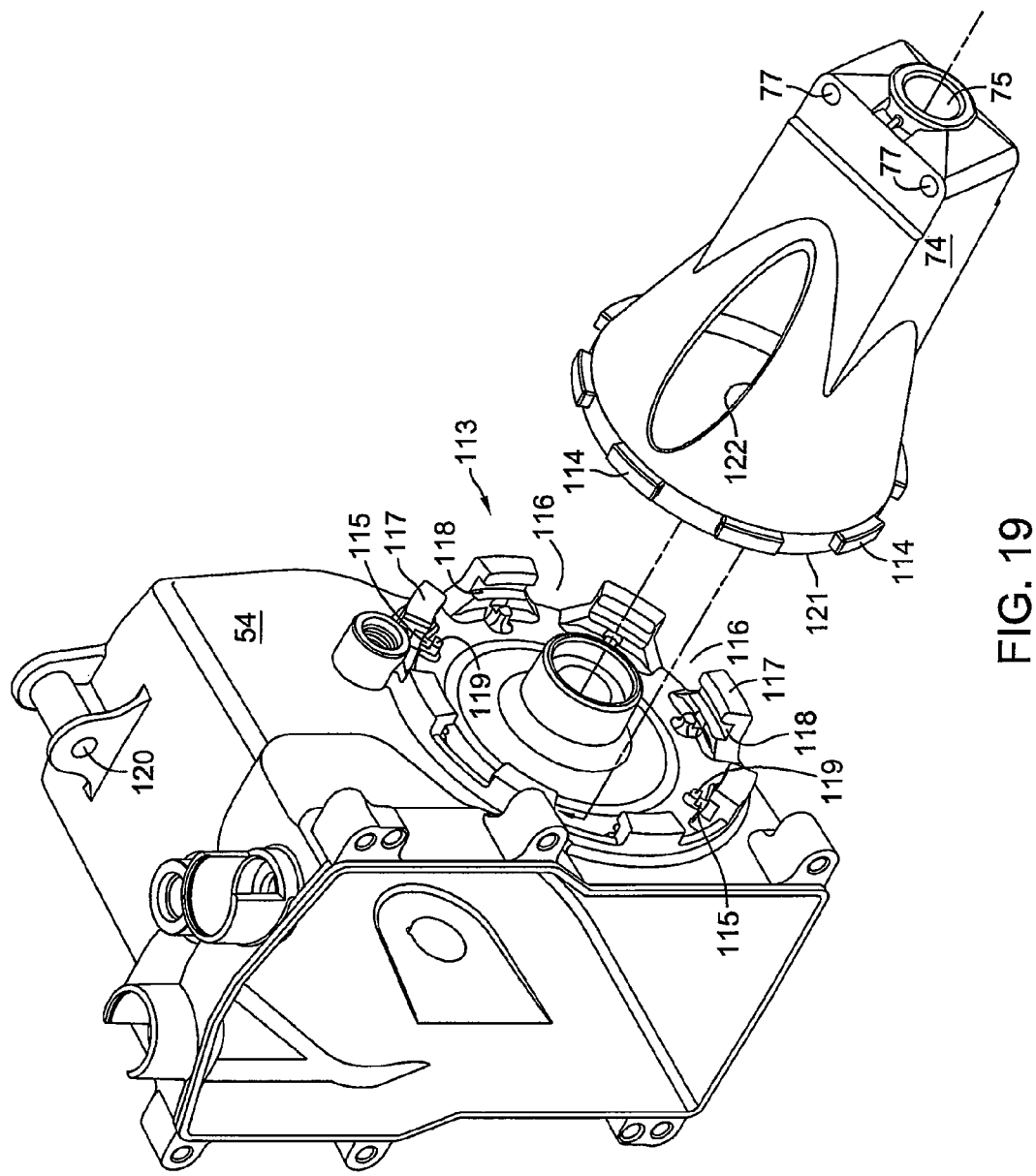
FIG. 19 is an exploded view of the second housing and one of the axle support housings.

Fasteners 79 and openings 77, as depicted in FIG. 1, may also serve to maintain the orientation between axle support housing 74 and second housing 54. As best seen in FIG. 19, and as discussed in detail below, the depicted embodiment of engagement structure 113 comprises a plurality of projections 117, each projection 117 having a slot 118 and being separated from the succeeding projection 117 by a gap 116. Support housing 74 has a plurality of projections 114 formed thereon. During assembly, the plurality of projections 114 are positioned in gaps 116 on second housing 54, and axle support housing 74 is rotated so that projections 114 engage slots 118, thus securing axle support housing 74 to second housing 54. However, axle support housing 74 may still rotate such that projections 114 become disengaged from slots 118. When drive device 16 is attached to vehicle frame (not shown) by fasteners 79, and a fastener 51 is located in opening 120, as seen, e.g., in FIG. 1, the rotation of axle support housing 74 with respect to second housing 54 is limited. Thus, the fasteners that attach drive device 16 to a vehicle frame also act to keep axle support housing 74 attached to drive device 16. This arrangement does permit, however, limited movement of axle support housing 74 relative to second housing 54 as the vehicle frame flexes in order to reduce the stress in axle support housing 74 under some load conditions, such as when drive device 16 is installed in a vehicle. It should be noted that other locations for fasteners may alternately be selected depending upon the application of drive device 16.

Because axle support housings 73 and 74 are essentially hollow, additional support for axle support housings 73 and 74 may be desirable. As these two axle support housings 73 and 74 are essentially identical, only one will be described. As seen in, e.g., FIG. 19, housing 54 and support housing 74 have a plurality of support structures.

Each support structure includes lip 119, formed adjacent projection 117 to form groove 115. Edge 121 of axle support housing 74 may then rest in groove 115 when axle support housing 74 is attached to second housing 54 to maintain the shape and position of axle support housing 74. Second housing 54 has a plurality of projections 117 and a plurality of lips 119. The support for axle support housing 74 may allow axle support housing 74 to be formed of aluminum or a plastic. The plastic may be an approximately 30% glass filled nylon 6/6. In the depicted embodiment, axle support housing 74 comprises a 33% glass filled nylon 6/6. It will be appreciated by those in the art that under certain conditions, an aluminum axle support housing 74 may be cast as a single element with second housing 54.

Axle support housing 74 may have additional features. For example, openings 122 serve to reduce the amount of material or debris that may build up within axle support housing 74, since axle support housing 74 is mated to second housing 54 without sealing. Thus, debris that might enter axle support housing 74 may either fall through an opening 122 located on the bottom of axle support housing 74, or water or other cleaning fluid may be introduced into one of the openings 122 to clean the interior of axle support housing 74.

When joined together by a plurality of fasteners 55, first housing 52 and second housing 54 form a sump that provides the hydraulic fluid for hydraulic pump 36, hydraulic motor 40 and the other hydraulic elements of drive device 16. Because the fluid in the sump can expand or contract with changes in temperature, a vent is typically provided for the sump.

Figure 20:
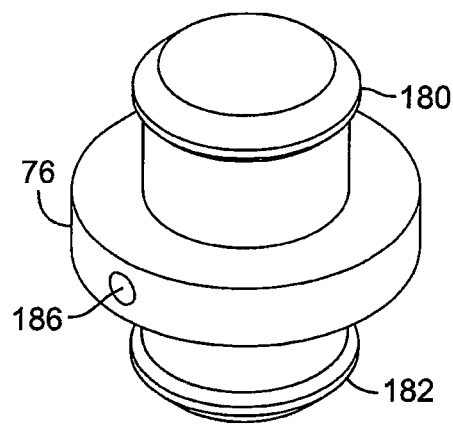
FIG. 20 is a perspective view of a vent in accordance with the principles of the present invention.
Figure 21:
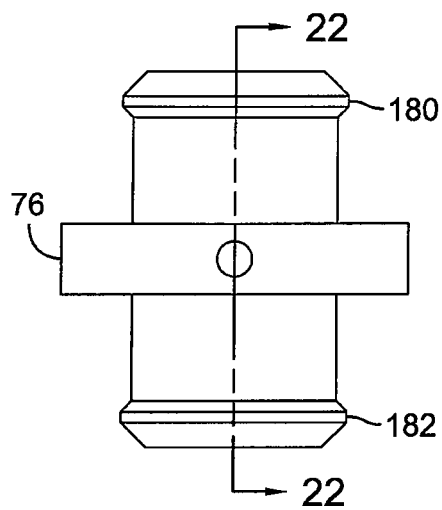
FIG. 21 is a side elevational view of the vent shown in FIG. 20.
Figure 22:
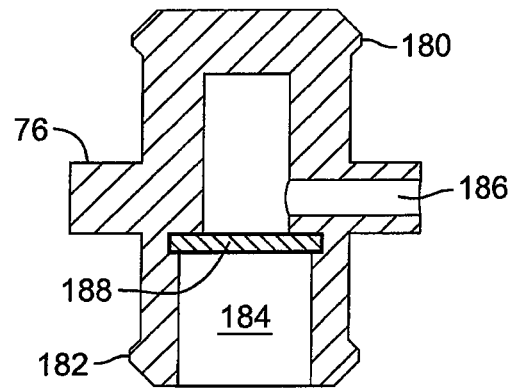
FIG. 22 is a sectional view along the lines 22-22 of FIG. 21.

Vent 76, which is preferably of a material that provides a fluid seal, such as rubber, may be seen in more detail in FIGS. 20-22. Vent 76 may be installed in a hole such as hole 78, and may be installed in different orientations; it comprises a first side 180 that prevents air from entering or exiting drive device 16, and a second side 182 that permits communication between the sump (not shown) and the external environment. First side 180 of vent 76 is installed into drive device 16 during shipping, or at other times when leaking of hydraulic fluid is a possibility. Once drive device 16 reaches an original equipment manufacturer or other end user, vent 76 is removed from drive device 16 and installed again into drive device 16 with second side 182 inserted into drive device 16. With second side 182 installed in drive device 16, air may be exchanged between the exterior of drive device 16 and the internal sump of drive device 16 by way of first passage 184 and second passage 186, with the direction of air movement dependent on whether the hydraulic fluid within drive device 16 is expanding or contracting. An air permeable, water impermeable membrane 188 may optionally be included in vent 76 to minimize the introduction of water or water vapor into the internal sump.

While a specific embodiment of the invention has been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalent thereof.

What is claimed is:

1. A center section for use in a drive device for a vehicle, the center section comprising:
    a pump mounting portion comprising a pump running surface and a first pair of kidney ports formed on the pump running surface;
    a motor mounting portion comprising a motor running surface formed coplanar with the pump running surface and a second pair of kidney ports formed on the motor running surface;
    a first fluid passage structure engaged to both the pump mounting portion and the motor mounting portion, the first fluid passage structure having a first porting formed therein to fluidly connect one of the first pair of kidney ports with one of the second pair of kidney ports;
    a second fluid passage structure engaged to both the pump mounting portion and the motor mounting portion, the second fluid passage structure having a second porting formed therein to fluidly connect the other of the first pair of kidney ports with the other of the second pair of kidney ports;
    a central rib integrally formed with the first and the second fluid passage structures and disposed between the pump mounting portion and the motor mounting portion, the central rib comprising a first end extending to a first side of the center section, and a second end extending to a second side of the center section, opposite the first side;
    a first strengthening rib extending from the first side of the center section to the pump mounting portion;
    a second strengthening rib extending from the second side of the center section to the pump mounting portion;
    a third strengthening rib extending from the first side of the center section to the motor mounting portion;
    a fourth strengthening rib extending from the second side of the center section to the motor mounting portion; and
    a plurality of areas located between the first side of the center section and the second side of the center section, wherein each area comprises a reduced amount of material compared to the amount of material in each of the strengthening ribs.

2. The center section as set forth in claim 1, wherein the central rib, the first strengthening rib and the second strengthening rib form a generally triangular pattern.

3. The center section as set forth in claim 2, wherein the central rib, the third strengthening rib and the fourth strengthening rib form a generally triangular pattern.

4. The center section as set forth in claim 1, further comprising at least one valve disposed within the center section.

5. The center section as set forth in claim 4, wherein the at least one valve comprises a shock valve.

6. The center section as set forth in claim 4, wherein the at least one valve comprises a check valve.

7. A drive device driven by a prime mover, the drive device comprising:
- a housing having a first side and a second side formed opposite the first side;
- a first axle extending from the first side of the housing, and a second axle extending from the second side of the housing;
- a hydraulic pump driven by the prime mover;
- a hydraulic motor driven by the hydraulic pump;
- a center section disposed within the housing, the center section comprising:
  - a pump mounting portion comprising a pump running surface, wherein the hydraulic pump is rotatably disposed on the pump running surface;
  - a motor mounting portion comprising a motor running surface formed coplanar with the pump running surface, wherein the hydraulic motor is rotatably disposed on the motor running surface, and wherein the axis of rotation of the hydraulic pump and the axis of rotation of the hydraulic motor define a first plane;
  - a first fluid passage structure and a second fluid passage structure, each fluid passage structure engaged to the pump mounting portion and the motor mounting portion;
  - porting formed inside each of the first and the second fluid passage structures, the porting fluidly connecting the pump running surface with the motor running surface; and
  - a plurality of strengthening ribs engaged to the pump mounting portion, the motor mounting portion and the first and second fluid passage structures, wherein at least a portion of the plurality of strengthening ribs are formed in a generally diamond-shaped pattern, and at least one of the plurality of strengthening ribs lies in a second plane that is perpendicular to both the pump running surface and the first plane;
- a clutch mechanism supported by the center section and driven by the hydraulic motor;
- a first gear train selectively driven by the clutch mechanism and drivingly engaged to the first axle; and
- a second gear train selectively driven by the clutch mechanism and drivingly engaged to the second axle.

8. The drive device as set forth in claim 7, further comprising a sump formed in the housing and a vent, the vent having a first orientation, which prevents fluid communication between the sump and the environment external to the housing, and a second orientation, which permits the exchange of gases between the sump and the environment external to the housing.

9. The drive device as set forth in claim 7, wherein the clutch mechanism further comprises:
- a clutch gear comprising a first end, a second end formed opposite the first end, and a clutch gear body disposed between the first and the second ends;
- an input gear form disposed on the clutch gear;
- a first flange gear drivingly engaged to the first axle and located proximate to the clutch gear first end;
- a first ring engaged to the clutch gear proximate to the clutch gear first end, the first ring movable between a first position, in which the first ring is engaged to and drives the first flange gear, and a second position, in which the first ring is disengaged from the first flange gear;
- a second flange gear drivingly engaged to the second axle and located proximate to the clutch gear second end;
- a second ring engaged to the clutch gear proximate to the clutch gear second end, the second ring movable between a first position, in which the second ring is engaged to and drives the second flange gear, and a second position, in which the second ring is disengaged from the second flange gear.

10. The drive device as set forth in claim 9, further comprising a first fork disposed proximate to the first ring, wherein the first fork moves the first ring from its first position to its second position.

11. The drive device as set forth in claim 9, further comprising at least one biasing spring acting on the first ring and at least one fork located proximate to the first ring, wherein the at least one biasing spring biases the first ring to one of its first or second positions, and the at least one fork moves the first ring to the other of its first or second positions.

12. The drive device as set forth in claim 9, further comprising a plurality of slots formed in the clutch gear body.

13. The drive device as set forth in claim 12, further comprising a plurality of protrusions formed on the first and the second rings, wherein each of the plurality of protrusions is slidably located within one of the plurality of slots.

14. The drive device as set forth in claim 12, further comprising a plurality of biasing springs, wherein each spring is located within one of the plurality of slots.

15. The drive device as set forth in claim 14, wherein each biasing spring engages both the first and the second ring.

* * * * *